(12) United States Patent
Oertel et al.

(10) Patent No.: US 10,108,203 B2
(45) Date of Patent: Oct. 23, 2018

(54) PRESSURE SENSOR AND SYSTEM FOR REGULATING A VENTILATION DEVICE

(71) Applicant: ROBERT BOSCH GMBH, Stuttgart (DE)

(72) Inventors: Kai Oertel, Stuttgart (DE); Maxime Loidreau, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 332 days.

(21) Appl. No.: 13/914,207

(22) Filed: Jun. 10, 2013

(65) Prior Publication Data

US 2013/0338840 A1    Dec. 19, 2013

(30) Foreign Application Priority Data

Jun. 14, 2012  (DE) ......................... 10 2012 210 041

(51) Int. Cl.
| | | |
|---|---|---|
| *G05D 7/06* | (2006.01) | |
| *G01K 1/02* | (2006.01) | |
| *G01L 7/00* | (2006.01) | |
| *G01L 19/08* | (2006.01) | |
| *F24F 11/30* | (2018.01) | |
| *F24F 11/63* | (2018.01) | |
| *F24F 11/70* | (2018.01) | |
| *F24F 110/10* | (2018.01) | |
| *F24F 110/40* | (2018.01) | |
| *F24F 11/56* | (2018.01) | |

(52) U.S. Cl.
CPC ............ *G05D 7/0617* (2013.01); *F24F 11/30* (2018.01); *F24F 11/70* (2018.01); *G01K 1/02* (2013.01); *G01L 7/00* (2013.01); *G01L 19/086* (2013.01); *F24F 11/56* (2018.01); *F24F 11/63* (2018.01); *F24F 2110/10* (2018.01); *F24F 2110/40* (2018.01); *G01K 2201/00* (2013.01)

(58) Field of Classification Search
CPC ................. F24F 11/0012; F24F 11/076; F24F 2011/0042; F24F 2011/0063; F24F 2011/0068; F24F 11/006; F24F 11/0076; F24F 11/63; F24F 11/70; F24F 2110/40; G01K 15/005; G01K 1/02; G01K 2201/00; G01L 19/086; G01L 7/00; G05D 7/0617
USPC ............. 700/282, 299, 301; 236/1 E; 702/50
See application file for complete search history.

(56) References Cited

U.S. PATENT DOCUMENTS

| | | | |
|---|---|---|---|
| 8,374,725 B1* | 2/2013 | Ols | F24F 11/0012 261/118 |
| 2003/0130815 A1* | 7/2003 | Cohen | A01K 1/031 702/140 |
| 2004/0144849 A1* | 7/2004 | Ahmed | G05B 15/02 236/1 E |

(Continued)

FOREIGN PATENT DOCUMENTS

DE          198 54 016          5/2000

*Primary Examiner* — Jennifer L Norton
(74) *Attorney, Agent, or Firm* — Norton Rose Fulbright US LLP; Gerard Messina

(57) ABSTRACT

A pressure sensor includes: a detection device for ascertaining air pressure and temperature; a computing unit; and a wireless interface. With the aid of the wireless interface, the pressure sensor data which represent a flow state in the surroundings of the pressure sensor are transferred wirelessly to a central control device. With the aid of the central control device, final control elements of a ventilation device are set.

7 Claims, 3 Drawing Sheets

(56) References Cited

U.S. PATENT DOCUMENTS

| | | | |
|---|---|---|---|
| 2004/0242147 A1* | 12/2004 | Cui | F24F 3/044 |
| | | | 454/229 |
| 2007/0045429 A1* | 3/2007 | Chapman, Jr. | F24F 11/0012 |
| | | | 236/46 C |
| 2007/0093194 A1* | 4/2007 | Dinescu | B60H 1/24 |
| | | | 454/121 |
| 2007/0205297 A1* | 9/2007 | Finkam | F24F 11/001 |
| | | | 236/1 C |
| 2009/0287866 A1* | 11/2009 | Mejias | H04L 12/2816 |
| | | | 710/110 |
| 2010/0298993 A1* | 11/2010 | Eaton | H01R 13/6456 |
| | | | 700/282 |
| 2011/0093424 A1* | 4/2011 | Zimmermann | G05B 17/02 |
| | | | 706/47 |
| 2012/0109404 A1* | 5/2012 | Pandey | H04L 67/12 |
| | | | 700/299 |
| 2012/0125558 A1* | 5/2012 | Nortman | G01F 1/68 |
| | | | 165/11.1 |
| 2012/0253524 A1* | 10/2012 | Norrell | F24F 13/1426 |
| | | | 700/277 |
| 2013/0090769 A1* | 4/2013 | McKie | F24F 11/006 |
| | | | 700/277 |
| 2014/0208857 A1* | 7/2014 | Phan Le | B81C 1/00158 |
| | | | 73/702 |
| 2016/0091220 A1* | 3/2016 | Kates | F24F 11/006 |
| | | | 236/1 B |

* cited by examiner

PRESSURE SENSOR AND SYSTEM FOR REGULATING A VENTILATION DEVICE

BACKGROUND OF THE INVENTION

1. Field of the Invention

The present invention relates to a pressure sensor and a system for regulating a ventilation device. The present invention furthermore relates to a method for regulating a ventilation state of at least one indoor space.

2. Description of the Related Art

It is known that ventilation devices are increasingly being used in buildings for supporting indoor comfort, including in living areas. In the case of retrofitting such devices, multiple inlets are generally to be provided on an exterior wall for that purpose, the inlets carrying out the central air suctions in the bathroom and kitchen or concepts for cross-ventilation. To avoid unpleasant air flows or unnecessary energy consumption, inlet and outlet air flows must be coordinated with one another. This is accomplished using adjustable outlets and increasingly also using speed-controlled fans. Problematic flow situations, in particular in the case when the ventilation is installed later, are very difficult to regulate.

Published German patent application document DE 198 54 016 A1 discloses a ventilation system for a building having a control unit for driving a final control element connected to a window. The control unit is activated as a function of a control or regulating variable influencing the volume of inlet air—preferably by an output signal of a unit for activating an individual room fan or an outlet air flap.

BRIEF SUMMARY OF THE INVENTION

According to a first aspect, the present invention provides a pressure sensor having:
 a detection device for ascertaining air pressure and temperature;
 a computing unit; and
 a wireless interface.

According to another aspect, the present invention provides a system for regulating a ventilation device, having:
 at least one pressure sensor for detecting an air flow, the pressure sensor having a wireless interface; and
 a control device, it being possible to transfer data of the pressure sensor to the control device with the aid of the wireless interface, the control device being able to use the data for setting elements of the ventilation device.

According to another aspect, the present invention provides a method for regulating a ventilation state of at least one indoor space, including the steps:
 ascertaining a flow situation in the indoor space using at least one pressure sensor;
 wireless transfer of data of the flow situation from the pressure sensor to a control device; and
 adapting the flow situation using a ventilation device activated by the control device as a function of the ascertained flow situation.

The idea underlying the present invention is that with the aid of the pressure sensor according to the present invention, it is possible to detect flow conditions in an indoor space via a measurement of pressure differences. The above-named data are transferred wirelessly to a central control device and are used by the control device for setting or adaptively adjusting the flow conditions with the aid of a ventilation device. On the one hand, this makes a very flexible overall design of a regulatable ventilation device possible, and, on the other hand, an already existing ventilation device may be equipped later with a comfortable control unit in a simple way.

One preferred specific embodiment of the pressure sensor according to the present invention is characterized in that evaluation software may be run on the computing unit, with the aid of which it is possible to ascertain a flow situation in the surroundings of the pressure sensor.

Advantageously, the pressure sensor may detect a flow situation in its surroundings independently via an ascertainment of pressure differences. By modifying the software, it is possible to coordinate or readjust evaluation characteristics of the pressure sensor in a simple way.

Another preferred specific embodiment of the pressure sensor provides that the pressure sensor is able to detect operating states of a ventilation device. This makes it, for example, advantageously possible to detect positions of displaceable or settable elements of the ventilation device, for example, windows, flaps, doors, fans, etc., and to transfer this information to a controlling device.

Another advantageous specific embodiment of the pressure sensor provides that it is possible to transfer data of the pressure sensor with the aid of the wireless interface. This advantageously makes it possible to transfer the data to communication users wirelessly. The wireless principle advantageously supports a simple and flexible installation or a retrofitting capability of the pressure sensors. In one preferred specific embodiment, the wireless transfer of the data is IP-based (Internet Protocol) with the aid of the wireless interface. Furthermore, the pressure sensor has an autonomous power supply in the form of an energy storage, in particular, a battery and/or an accumulator.

Another preferred specific embodiment of the pressure sensor is characterized in that, with the aid of the wireless interface, it is possible to exchange data with at least one additional pressure sensor and/or with a control device. This advantageously results in a type of networking of the pressure sensors which supports an improved ascertainment of flow situations.

One preferred specific embodiment of the pressure sensor provides that the evaluation software is self-learning. Advantageously, this supports an adaptive familiarization with changing flow situations in the surroundings of the pressure sensor.

One preferred specific embodiment of the system according to the present invention provides that the pressure sensor has an evaluation functionality concerning a flow situation in the surroundings of the pressure sensor, evaluation data of the pressure sensor being used by the control device in such a way that a predefined ventilation state is set. This advantageously makes it possible to achieve continuous readjustment of the ventilation state based on instantaneous data of a flow situation.

Another advantageous refinement of the system provides that at least two pressure sensors placed at different locations are able to exchange information with one another and/or with the control device. This advantageously forms a type of networking of the pressure sensors, making it possible to improve the detection of instantaneous flow situations.

One preferred specific embodiment of the system is characterized in that the system is scalable. This makes it possible to vary a number of the pressure sensors and accordingly adapt a detection of the flow conditions advantageously to changing or different spatial situations.

One preferred refinement of the method according to the present invention provides that operating states of elements of a ventilation device in the surroundings of the pressure sensor are detected with the aid of at least one pressure sensor. This makes it possible for a very good overall picture of the elements adjusted by the control device to be advantageously transferred to the control device.

Additional features and advantages of the present invention are elucidated in the following based on specific embodiments with reference to the drawings. The drawings are primarily intended to illustrate the principles essential to the present invention. Identical reference numerals in the figures denote identical elements or elements having an identical function.

DETAILED DESCRIPTION OF THE INVENTION

Figure 1:
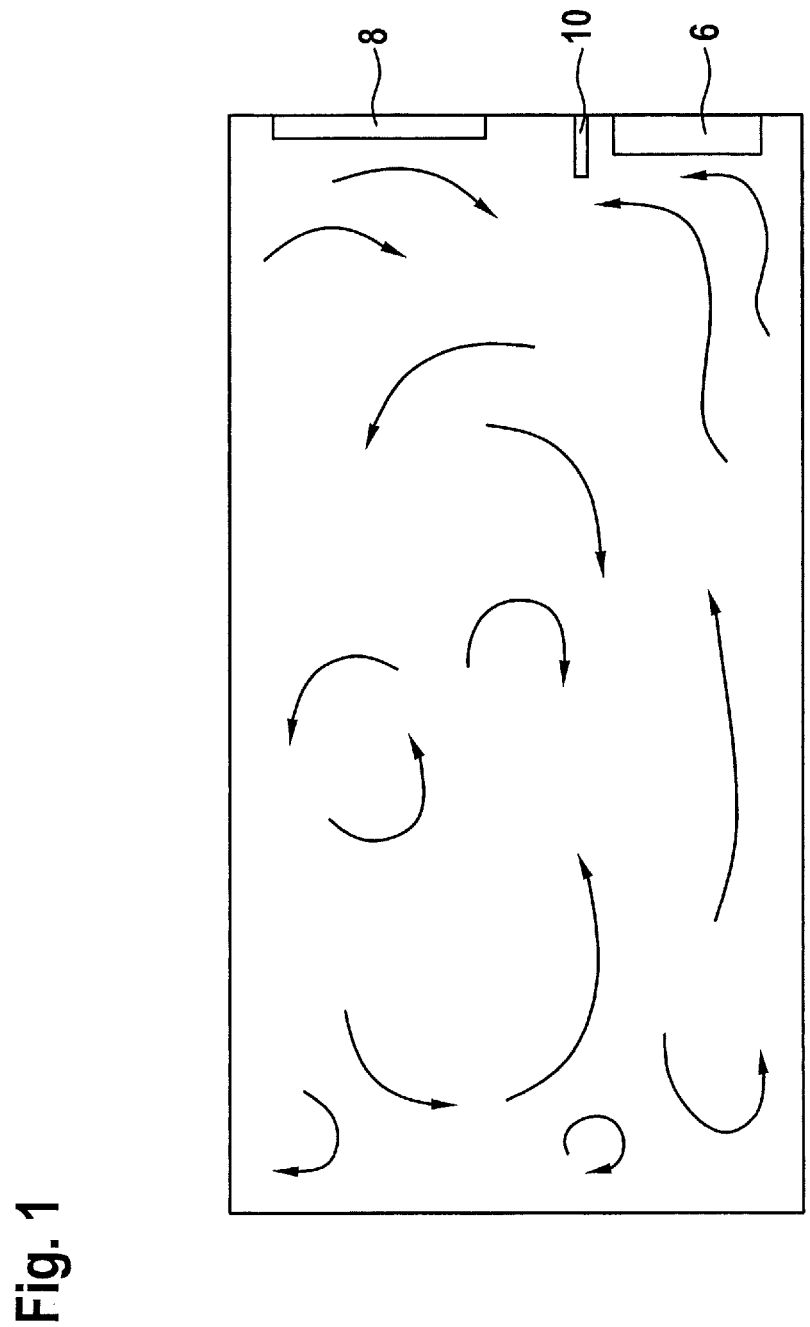
FIG. 1 shows a schematic diagram of a flow situation in an indoor space.

In a schematic cross-sectional view, FIG. 1 shows a diagram of a flow situation in an indoor space of a building. An air flow sweeps along a heated radiator 6 beneath a window sill 10 essentially from bottom to top and along a window 8 essentially from top to bottom. Directions of air flows generated by free convection are indicated by arrows. With the aid of the system according to the present invention, these flows are ascertained in order to regulate a ventilation state or a flow situation within the indoor space from this information.

Figure 2:
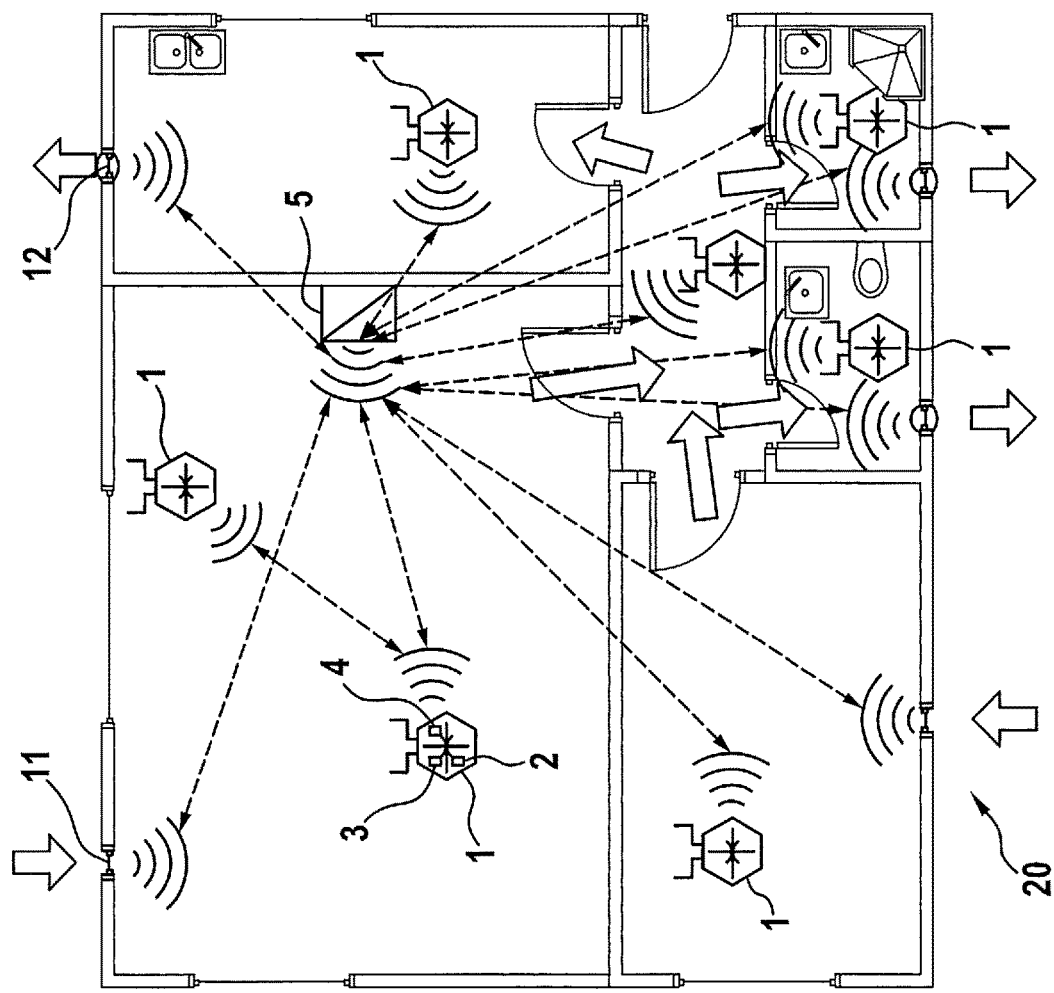
FIG. 2 shows a schematic diagram of a first specific embodiment of the system according to the present invention for regulating a ventilation device.

FIG. 2 shows a top view of a first specific embodiment of the system according to the present invention. System 20 has at least one, preferably multiple, pressure sensors 1 that are situated at a suitable position within several indoor spaces of a building. Each of pressure sensors 1 is equipped with a two-channel detection device 2 for ascertaining air pressure and temperature. Furthermore, pressure sensor 1 includes a computing unit 3, having a preferably high computational power (for example, a high-performance microcontroller) and a wireless interface 4. For the sake of clarity, computing unit 3 and wireless interface 4 are shown on only one single pressure sensor 1. Via wireless interface 4, data ascertained by pressure sensor 1 are transferred to other pressure sensors 1 or to a central control device 5 (for example, to a central device of a building automation system).

Each of pressure sensors 1 is able to ascertain flow situations within the room. For this purpose, the gas law of thermodynamics $$p \times B = n \times r \times T$$

having the parameters:
p . . . pressure
V . . . volume
n . . . amount of substance
r . . . ideal gas law constant
T . . . temperature is used in order to obtain the evaluation formula for pressure sensor 1 for determining a change in density after a differentiation:

$$dV/dT = n \times R \times d(T/p)/dT$$

Opening and closing of doors in a laboratory may be considered as a numerical example. The opening or closing of the door causes pressure changes of approximately 3 hPa to 5 hPa in each case, which is about 30 to 50 times greater than the resolution of the pressure sensor 1. Fume hoods may be mentioned as another example for air flow generators, conventional fume hoods causing air flows of several 100 m³/hr. The air pressure falls along flow lines, is stable in non-ventilated zones, and increases in air blockages.

With the aid of pressure sensors 1, pressure and temperature values are detected in this way at different locations in multiple rooms of the building at the same time. After a calibration phase without flow, these may be used for ascertaining the flow conditions or the flow speeds of the air.

Software is preferably implemented in computing unit 3, which calculates flow speeds from the ascertained temperature and pressure values. For the case that pressure sensor 1, with the aid of known position data, "knows" the location at which it is placed, one single pressure sensor 1 is able to ascertain the flow speed from the ascertained data. If this is not the case, at least one second pressure sensor 1 is required for ascertaining the flow speed.

Preferably, the above-named software is self-learning, which may mean, for example, that it has adaptive algorithms that detect the flow conditions on a long-term basis and thereby "become familiar with" them. As a result, the software may even deliver specific information concerning positions of elements of a ventilation device (e.g., window open/closed, flap open/closed, door open/closed) to control device 5.

This makes it possible for the operating characteristics of centralized or decentralized ventilation devices to be adapted to instantaneous flow situations. The above-named ventilation devices may include, for example, final control elements in the form of adjustable flaps 11, adjustable blowers 12 or regulatable fans. The arrows represented in FIG. 2 show directions of air flows within (cross-flows) and outside of the rooms in a diagrammatic manner. An air flow is generally drawn into the building through flaps 11; an air flow is generally discharged from the building through blowers 12.

The ventilation flow adapted with the aid of system 20 according to the present invention makes it possible to advantageously minimize electrical energy consumption for blowers 12 and flaps 11 or increase a room comfort via an adapted air flow. Advantageously, wireless pressure sensors 1, which communicate exclusively with control device 5 by radio, make it possible to avoid wiring complexity. This makes it possible to place integrated, radio-based pressure sensors 1 in a simple way at the most suitable positions for the measurement and simply retrofit them into existing buildings.

Integrated micromechanical pressure sensors are available as known economically priced standard components, the resolution of modern pressure sensors (e.g., of the type Bosch BMP180) allowing a highly accurate detection of pressures. The above-named two-channel sensors also deliver a high-resolution local temperature signal. Both pieces of information are sufficient to determine flow speeds according to the present invention via pressure and temperature differences.

Figure 3:
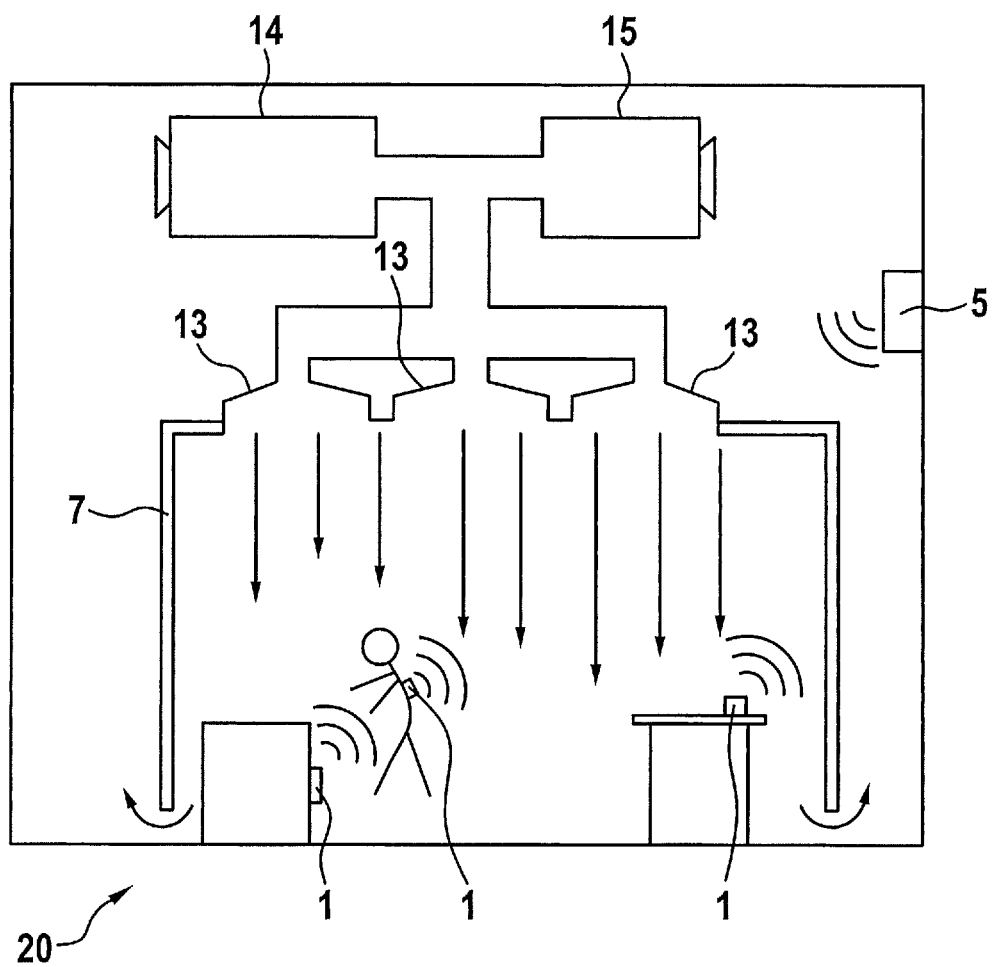
FIG. 3 shows a schematic diagram of a second specific embodiment of the system according to the present invention for regulating a ventilation device.

FIG. 3 shows a schematic diagram of a second specific embodiment of the system according to the present invention for regulating a ventilation device. System 20 is situated in an industrial clean room having a clean room cell 7. Multiple air nozzles 13 are recognizable above clean room cell 7, the air nozzles being supplied with a filtered air flow via a filtration and heating device 14 and/or a climate control device 15. An essentially laminar air flow extends downwardly from air nozzles 13, the main purpose of the laminar air flow being to remove dust particles from clean room cell 7, i.e., conveying them to the outside with the aid of suction systems (not shown) on the bottom of clean room cell 7.

According to the present invention, it is provided that multiple wireless pressure sensors 1 are attached at various positions for detecting flow speeds. Pressure sensors 1 may, for example, also be attached to persons within clean room cell 7. Furthermore, pressure sensor 1 may be situated at various additional positions (for example, industrial equipment) within clean room cell 7. The flow speed of the laminar air flow adapted with the aid of the detected flows thus makes it possible to eliminate an interfering turbulence and accordingly a potential source of dust. The basic mode of operation with the aid of wireless interface 4 is the same as has been already explained above with reference to FIG. 2.

As a result, air flows within clean room cell 7 are thus advantageously regulated by filtration and heating device 14 activated by control device 5 and/or climate control device 15. The regulated air flow makes it possible in this way to regulate air purity, i.e., an important parameter for industrial clean rooms.

In summary, using the present invention, a pressure sensor, a system and a method are provided, which allow an adaptive regulation of a ventilation state within a room in a simple and convenient manner. With the aid of networked, decentrally positioned "intelligent" pressure sensors, which are able to detect flow states in the surroundings of the pressure sensors, data representing a flow state in the surroundings of the pressure sensors are transmitted via a wireless interface to a central control device.

Consequently, final control elements of a ventilation device are activated with the aid of the control device and a flow situation is adapted as a result. The system according to the present invention is scalable, with the result that tasks may be carried out on a higher level of abstraction using data which have been ascertained on a lower level of abstraction.

The intended flow situation is advantageously predefined in such a way that power consumption of the ventilation device is minimized, operating characteristics of elements of the ventilation device are time-controlled, an air flow is set in a pre-defined manner (for example, minimized), etc.

Advantageously, a conventional pressure sensor may be simply and cost-effectively retrofitted to become a radio-based pressure sensor according to the present invention with the aid of a computing unit and a wireless interface.

Although the present invention has been described with reference to preferred exemplary embodiments, it is not limited thereto. In particular, the above-named examples of rooms and ventilation devices are merely exemplary. It is of course also conceivable to use the present invention for any situations in which gaseous fluids are to be moved in spaces in a defined manner.

Those skilled in the art will therefore modify or combine the described features of the present invention in a suitable way, without departing from the essence of the invention.

What is claimed is:

1. A sensor, comprising:
 a first detection device that:
  is positioned at a first region of a building;
  ascertains data corresponding to an air pressure and a temperature at the first region;
  includes a computing unit and a wireless interface; and
  receives, via the wireless interface and from a second detection device that is positioned at a second region of the building that is non-proximal to the first region, data corresponding to an air pressure and a temperature at the second region;
 wherein:
  the computing unit determines a flow speed of air within a spatial zone of the building based on the ascertained data corresponding to the air pressure and the temperature at the first region and the received data corresponding to the air pressure and the temperature at the second region; and
  the sensor causes a modification to a ventilation state within the spatial zone by outputting the determined flow speed via the wireless interface to a control device to which the sensor is communicatively coupled and that responds to the determined flow speed from the sensor by controlling, as a function of the determined flow speed, elements of a ventilation device.

2. The sensor as recited in claim 1, wherein the sensor is configured to detect operating states of the ventilation device.

3. The sensor as recited in claim 1, wherein the output of the determined flow speed is via the wireless interface.

4. The sensor as recited in claim 1, wherein the first detection device is configured to transmit, via the wireless interface and to the second detection device, the data corresponding to the air pressure and the temperature at the first region.

5. The sensor as recited in claim 1, wherein the computing unit is configured to determine the flow speed by executing a self-learning evaluation software.

6. The sensor as recited in claim 1, wherein the first and second regions are in different rooms of the building.

7. A sensor, comprising:
 a first detection device that:
  is positioned at a first region of a building;
  ascertains data corresponding to an air pressure and a temperature at the first region at a point in time;
  includes a computing unit and a wireless interface; and
  receives, via the wireless interface and from a second detection device that is positioned at a second region of the building that is non-proximal to the first region, data corresponding to an air pressure and a temperature prevailing at the same point in time at the second region;
 wherein:
  the computing unit determines a flow speed of air within a spatial zone of the building based on the ascertained data corresponding to the air pressure and the temperature at the first region and the received data corresponding to the air pressure and the temperature prevailing at the same point in time at the second region; and
  the sensor causes a modification to a ventilation state within the spatial zone by outputting the determined flow speed via the wireless interface to a control device to which the sensor is communicatively coupled and that responds to the determined flow speed from the sensor by controlling, as a function of the determined flow speed, elements of a ventilation device.

* * * * *